(12) United States Patent
Lam et al.

(10) Patent No.: US 7,410,154 B2
(45) Date of Patent: Aug. 12, 2008

(54) FLUID DAMPER

(75) Inventors: Harn Lian Lam, Perak (MY); Harn Yan Lam, Perak (MY)

(73) Assignee: Harn Marketing SDN BHD, Perak (MY)

( * ) Notice: Subject to any disclaimer, the term of this patent is extended or adjusted under 35 U.S.C. 154(b) by 262 days.

(21) Appl. No.: 10/577,117

(22) PCT Filed: Nov. 4, 2004

(86) PCT No.: PCT/SG2004/000362

§ 371 (c)(1),
(2), (4) Date: Apr. 26, 2006

(87) PCT Pub. No.: WO2005/045278

PCT Pub. Date: May 19, 2005

(65) Prior Publication Data

US 2007/0158885 A1    Jul. 12, 2007

(30) Foreign Application Priority Data

Nov. 5, 2003  (MY) .............................. PI 2003 4213

(51) Int. Cl.
*B60G 11/56* (2006.01)
(52) U.S. Cl. .................... 267/226; 267/34; 267/221

(58) Field of Classification Search ............ 267/34, 267/64.11, 120, 221, 226; 188/300, 322.15; 16/66, 70, 84, 85
See application file for complete search history.

(56) References Cited

U.S. PATENT DOCUMENTS

| 4,948,103 | A | * | 8/1990 | Bowden et al. | ............... 267/34 |
| 5,220,706 | A | * | 6/1993 | Bivens | ......................... 16/66 |
| 5,579,874 | A | * | 12/1996 | Jeffries et al. | ........... 188/282.9 |
| 6,957,807 | B2 | * | 10/2005 | Zimmer et al. | ........... 267/64.11 |
| 7,076,834 | B2 | * | 7/2006 | Li | ................................. 16/85 |

FOREIGN PATENT DOCUMENTS

| DE | 20107426 U1 | 10/2001 |
| DE | 20307522 U1 | 10/2004 |
| EP | 1026421 A2 | 8/2000 |
| EP | 1236 925 A2 | 9/2002 |

\* cited by examiner

*Primary Examiner*—Christopher P Schwartz
(74) *Attorney, Agent, or Firm*—Volpe and Koenig, P.C.

(57) ABSTRACT

The invention is a fluidic damper which comprises a closed cylinder (100) containing a valve mechanism. The valve mechanism is attached to a piston rod (110), a portion of which (the piston rod) emerges through an opening in one end wall of the cylinder (100). The valve mechanism (90) comprises a disc (10) with an axle (15), a rotatable annular cover piece (20) and an annular turning piece (40). A spring (30) is disposed between the cover piece (20) and the turning piece (40).

18 Claims, 5 Drawing Sheets

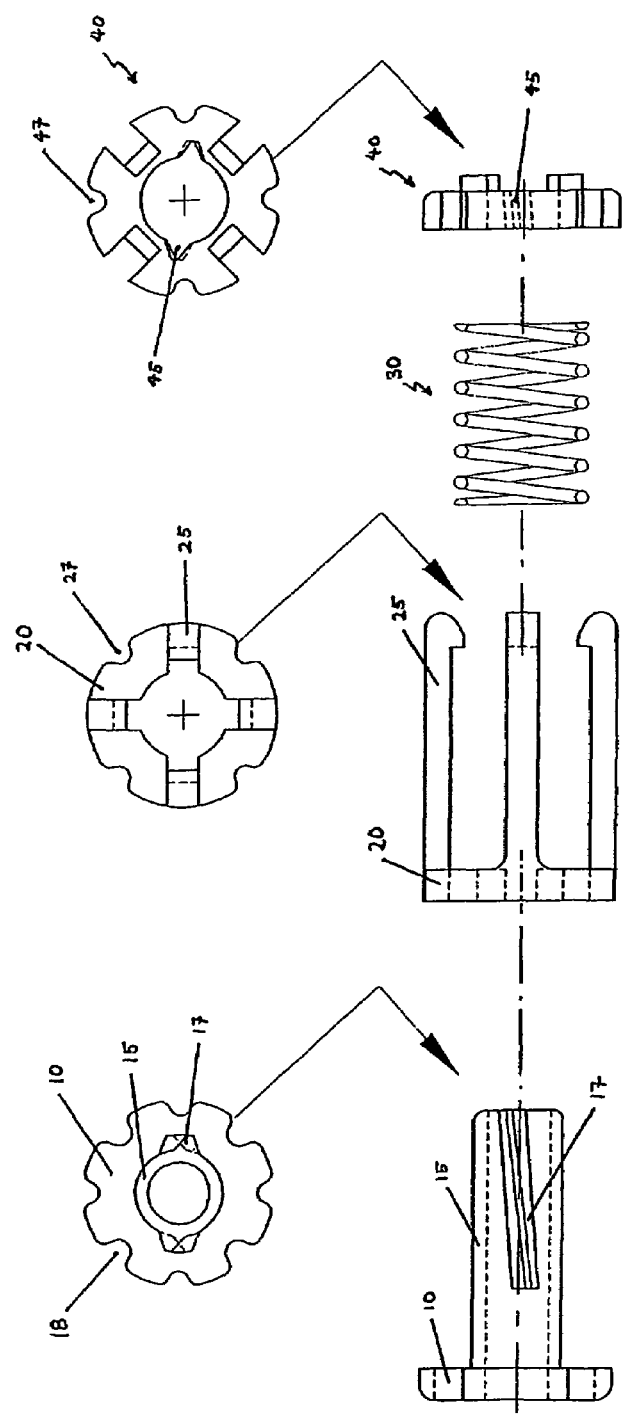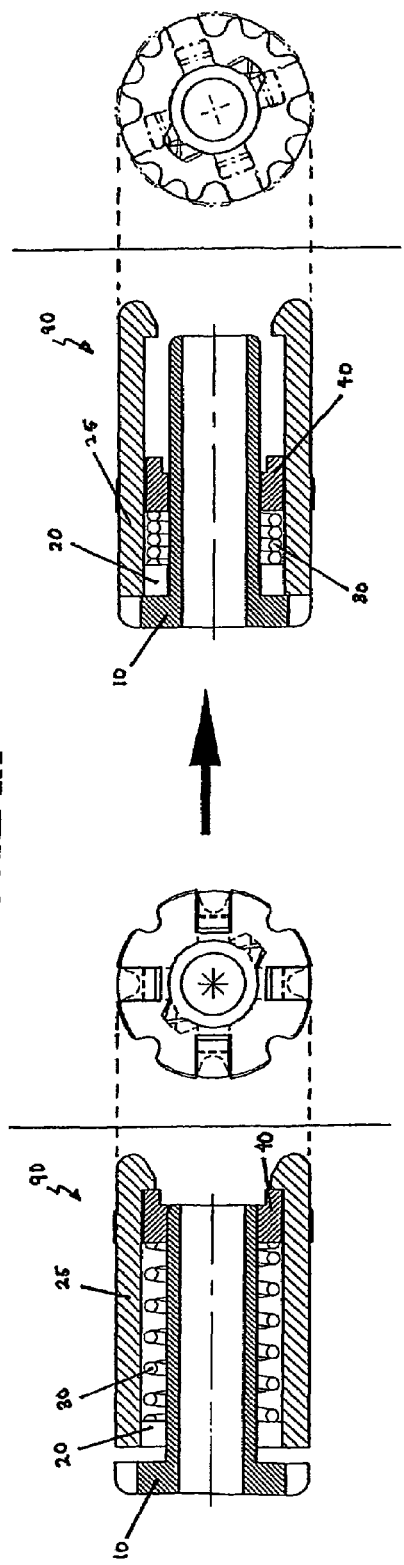
FIGURE 1A
FIGURE 2A
FIGURE 2B

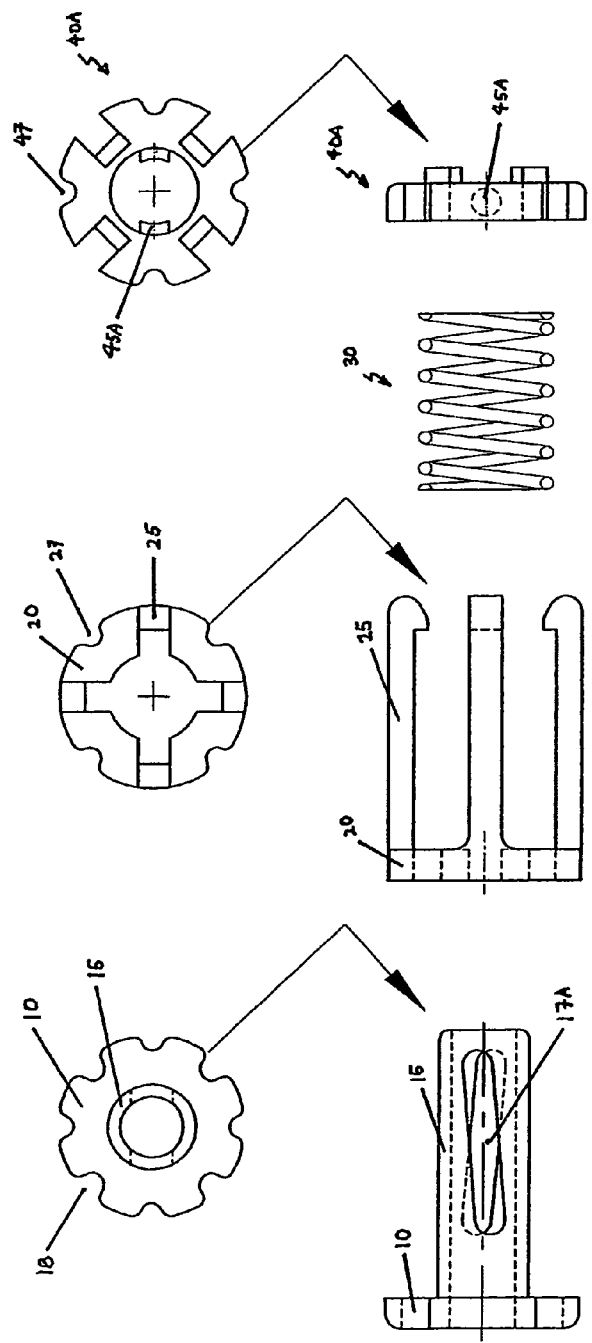
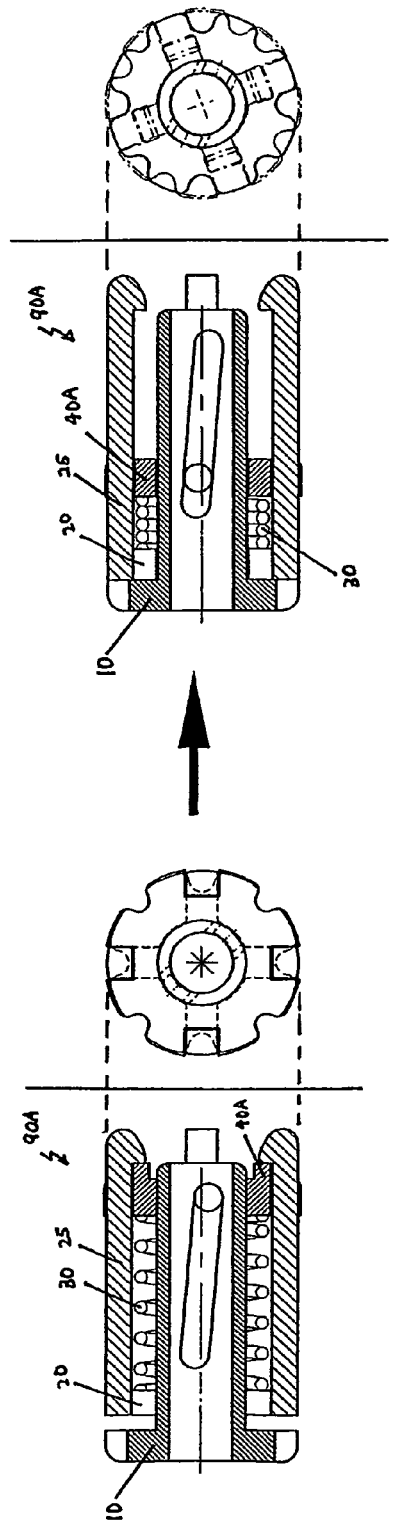
FIGURE 1B
FIGURE 2C
FIGURE 2D

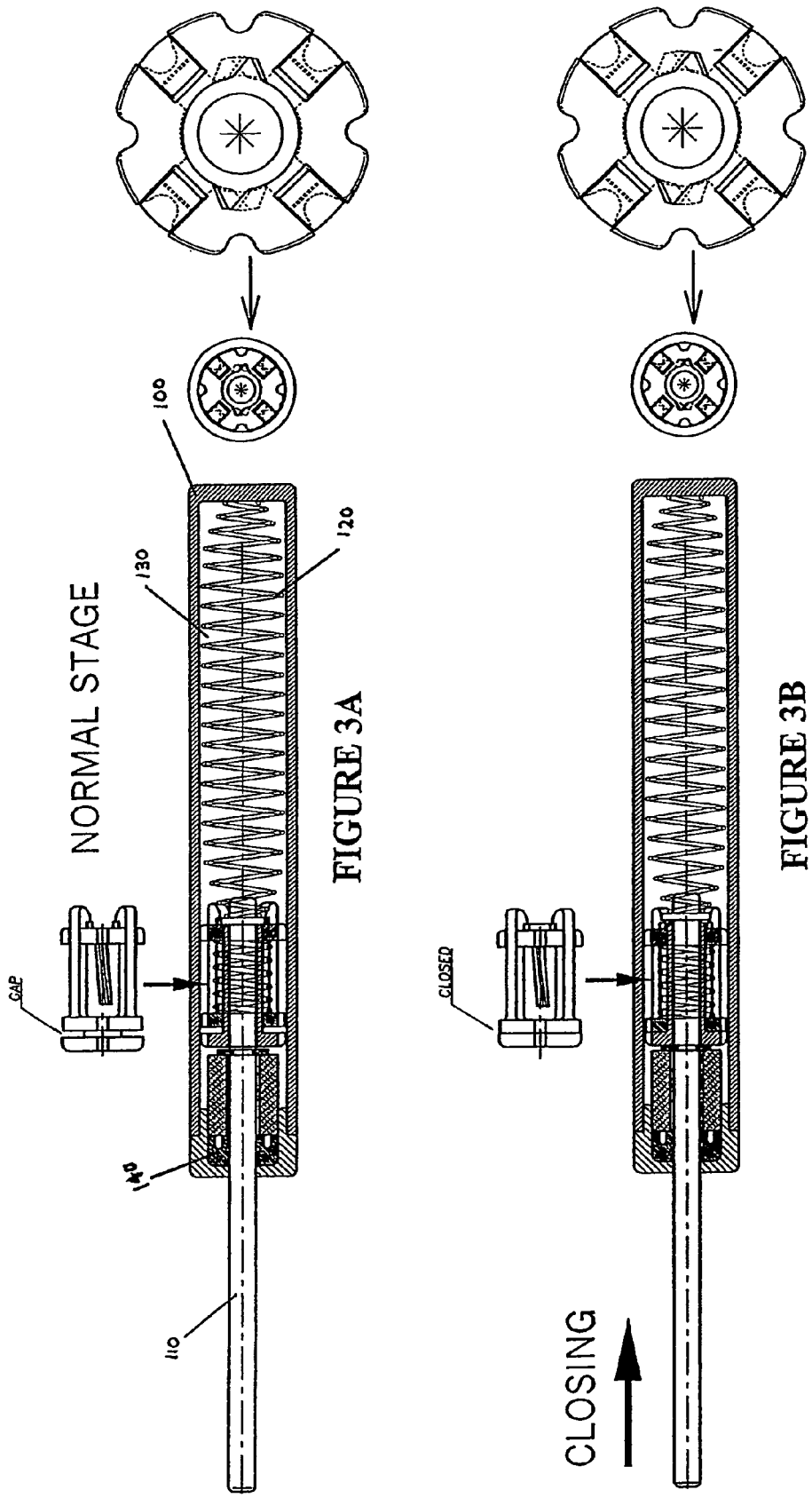

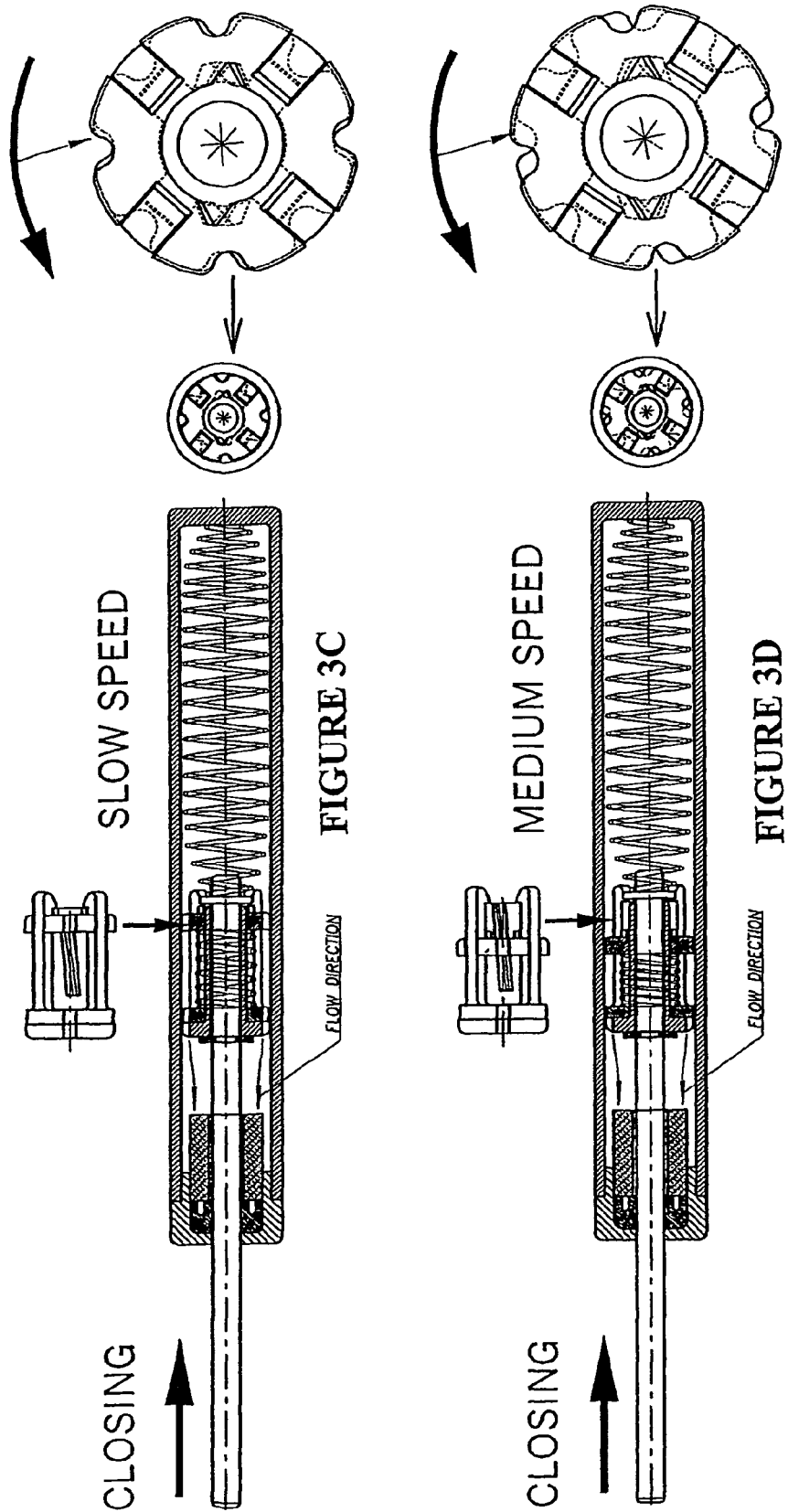

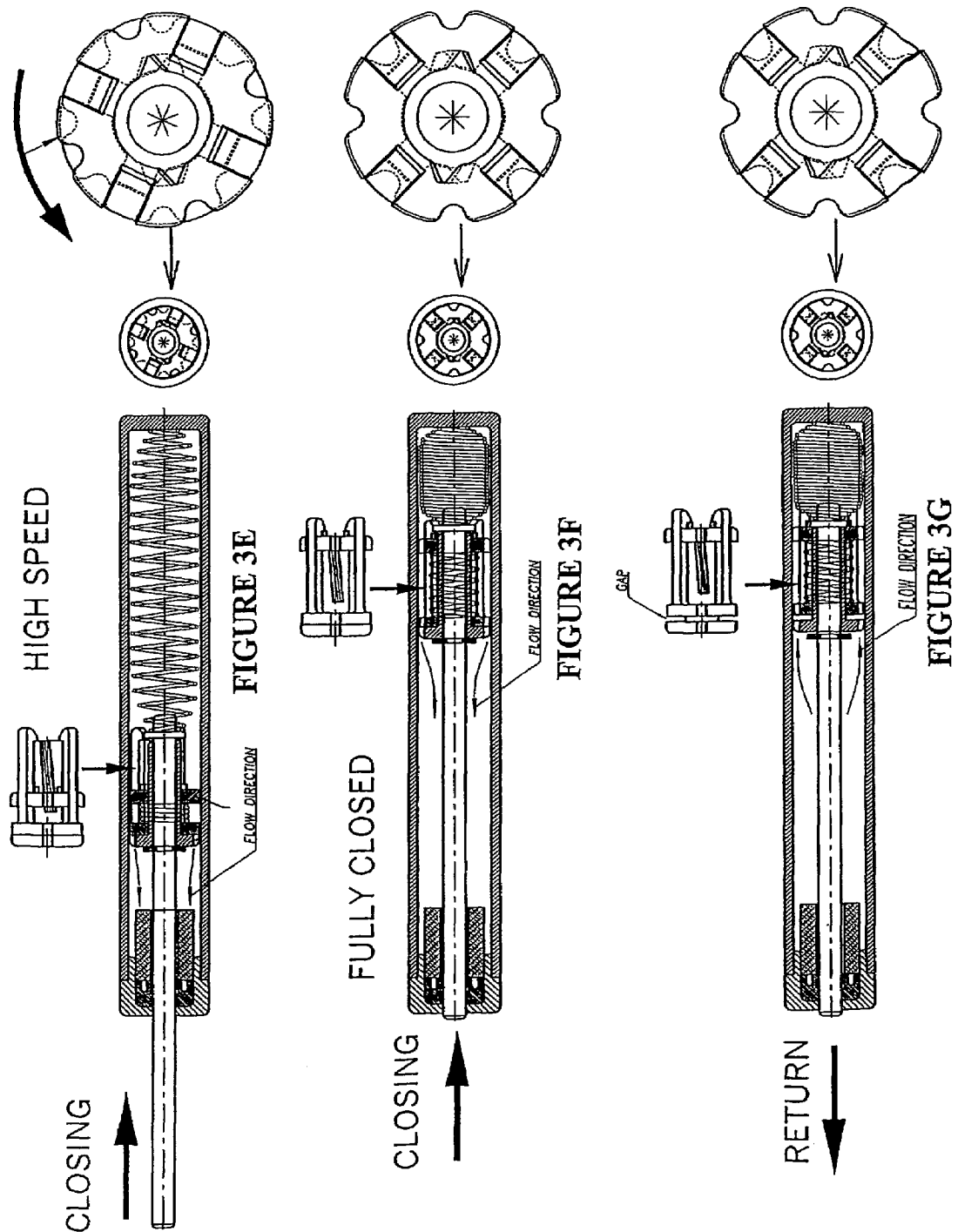

FLUID DAMPER

FIELD OF INVENTION

The invention relates to a fluidic damper which is used in movable components of a piece of furniture, for example a drawer or a door of wardrobe. It prevents the movable components from shutting with excessive force that would otherwise damage the components and generate undesired noise.

BACKGROUND

A movable component of a piece of furniture such as a drawer of a desk, or a door of a wardrobe generates a loud bang when it slams shut with excessive force. Such noise is distracting and a nuisance. Sometimes, the same piece of furniture may even be damaged as a result of such forceful action. It is, therefore, desirable to shut a door or a drawer in a more controlled manner.

Previously, this has been accomplished by installing a totally sealed device having a piston to resist the motion of door shutting, but such devices are difficult to adjust in a predictable and controllable way.

Subsequently, European Patent Application EP 1236 925 A2 discloses a damper assembly for the use in connection with drawer slides, and doors for cupboards. The damper assembly comprises a cylinder of uniform bore adapted to receive a piston in a sealing engagement with the bore and to move axially of the bore, the piston being provided with a piston rod in sealing engagement with a bush acting to close one end of the bore, the opposite end being permanently closed. Part of the piston, termed as the piston ring by the inventor, is made of a resiliently deformable material which flattens under compressive force and the same part is pressed against the inner wall of the cylinder to provide frictional force during the inward stroke of the piston into the cylinder. However, the disadvantage of this sort of damper assembly is that the piston ring is highly prone to frictional wear and tear.

A better alternative is to use a hydraulic or fluidic damper. A hydraulic or fluidic damper normally has a cylindrical housing within which a piston is movable in a linear fashion. The same piston is attached to a form of mechanism for providing resistive force on the piston. The mechanism is usually a cylindrical block or a disc, which spans across the entire cross section of the cylinder with slight spatial allowance between the inner wall of the housing and the peripheral surface of the mechanism. The interior space of the housing is filled with a viscous fluid, so when the mechanism moves within the interior space, it experiences some degree of drag owing to its obstruction against fluid flow from one side of the mechanism to another. Unlike the previous damper described earlier, the mechanism is less susceptible to wear and tear since the inner wall of the housing is lubricated with the same viscous fluid that induces the drag force for the mechanism.

However, a conventional fluidic damper is designed to resist motion of both inward and outward stroke of the piston. To cater for the need to resist only motion of the inward stroke of the piston when the drawer is shutting but not the outward stroke, some modification needs to be done to the mechanism. It is precisely the objective of this invention as described in this patent.

SUMMARY OF INVENTION

The invention is a fluidic damper which comprises a closed cylinder containing a valve mechanism. The valve mechanism is attached to a piston rod, a portion of which (the piston rod) emerges through an opening in one end wall of the cylinder.

The valve mechanism comprises:
 a disc having multiple passages for fluid to flow from one side of the said disc to the other side, and an axle with one or more guide members disposed on the surface of the said axle at an angle;
 a rotable annular cover piece which rotates about the said axle, such that rotation of the cover piece in one direction closes the said openings and in the other direction opens up the said openings;
 an annular turning piece, which is structurally connected to the cover piece, having some form of retention mechanism wherein the retention mechanism fits or engages slidingly to the said guide member on the surface of the said axle, so that the turning piece rotates when the retention mechanism slides along the guide member,
 a spring disposed between the said turning piece and the said cover piece, to push the turning piece back to its original position and consequently rotates the cover piece (20) to a position that opens up the openings of the said disc (10).

The turning piece is structurally connected to the cover piece by means of claws extending from the cover piece to the said turning piece.

In one embodiment, the guide member is a ridge and it fits to a channel on the inner edge of the turning piece. In another embodiment, the guide member is a groove and the retention mechanism is a knob extending from the inner surface of the turning piece.

In one embodiment, the axle is a hollow shaft to receive the piston rod.

In yet another embodiment, the fluidic damper has an additional spring which connects the closed end of the cylinder to the assembly of valve mechanism and piston rod to help the piston rod to restore to its original position before being depressed.

BRIEF DESCRIPTION OF THE FIGURES

FIG. 1A shows the different components which are present in the valve mechanism. It consists of an annular disc portion (10) having a hollow tube axle (15), a cover piece (20), a spring (30) and rotary piece (40)

FIG. 1B shows a different embodiment of the invention, with the guide member (17A) being a series of grooves which is meant to receive knobs (45A) found along the inner edge of the rotary piece (40A).

FIG. 2A refers to the assembly drawing of the valve mechanism when the spring (30) is uncompressed. The cover piece and the chamfered portions of the annular disc portion, the cover piece and the turning piece are exactly in line with each other, as shown in the front (axial) view.

FIG. 2B refers to the assembly drawing of the same valve mechanism when the spring (30) is compressed. The cover piece and the chamfered portions of the annular disc portion, the cover piece and the turning piece are totally covered, as shown in the front (axial) view.

FIG. 2C refers to the assembly drawing of the valve mechanism as depicted in FIG. 1B when the spring (30) is uncompressed. The cover piece and the chamfered portions of the annular disc portion, the cover piece and the turning piece are exactly in line with each other, as shown in the front (axial) view.

FIG. 2D refers to the assembly drawing of the same valve mechanism as depicted in FIG. 1B when the spring (30) is compressed. The cover piece and the chamfered portions of the annular disc portion, the cover piece and the turning piece are totally covered, as shown in the front (axial) view.

FIG. 3A shows that an embodiment of the damper, which has an additional spring connecting the closed end of the cylinder to the assembly of piston rod and valve mechanism when the piston is fully extended. There is a gap between the annular disc portion and the cover piece. The chamfered portions of the annular disc portion, the cover piece and the turning piece are exactly in line with each other.

FIG. 3B shows the closing of the gap between the annular disc portion and the cover piece when the piston rod is initially depressed.

FIG. 3C shows that the chamfered portions of the annular disc portion, the cover piece and the turning piece are slightly out of place when the piston rod being depressed at slow speed. This is because the turning piece has moved towards the cover piece slightly, and has rotated at the same time.

FIG. 3D shows that when the same piston rod is depressed at a faster speed, the turning piece, as well as the cover piece, has rotated more.

FIG. 3E shows that when the same piston rod is being withdrawn at an even faster speed, the chamfered portions of the annular disc portion, the cover piece and the turning piece are totally covered, as shown in FIG. 2B.

FIG. 3F shows that when the same piston rod is fully withdrawn into the cylinder, the additional spring is fully compressed. Without further movement of the piston, the chamfered portions of the annular disc portion, the cover piece and the turning piece are back in line with each other once again.

FIG. 3G shows that the chamfered portions of the annular disc portion, the cover piece and the turning piece remain in line with each other while the additional spring pushes the piston rod back out of the cylinder.

DETAILS OF THE INVENTION

The invention is a fluidic damper which consists of a cylinder (100) having a bore (130) through its longitudinal section for receiving a piston rod (110). One end of the cylinder (100) is closed while a portion of the piston rod (110) emerges through an opening at the other end. The remaining portion of the piston rod (110) lies inside the cylinder (100) and is mounted with a valve mechanism (90). The unoccupied space in the bore (130) is filled with a fluid and the interior of the cylinder (100) is kept fluid tight with a seal (140) flanging the opening.

In one embodiment, the closed end of the cylinder (100) is connected to the assembly of piston rod (110) and valve mechanism (90), with a spring (120). The function of the spring (120) is to push the piston rod (110) back to its fully extended position when the piston rod (110) is not depressed. Alternatively, the external end of the piston rod (110) may be attached to the movable part of the furniture and the piston rod (110), in this case, extends together with the movable part of the furniture without a need of having an additional spring to push the piston rod (110) out of the cylinder bore (130).

The valve mechanism (90) essentially consists of a disc portion (10), and an annular cover piece (20) that turns about the axis joining the center of the two when the valve mechanism (90) exceeds certain speed in the fluid-filled bore.

The disc portion (10) is placed across the bore (130) inside the cylinder (100) with a surface facing the closed end of the cylinder (100). Preferably, the disc portion (10) should cover up the entire inner cross section of the bore (130). Part of the circular periphery of the disc portion (10) is removed to allow the fluid to escape from one side of the disc portion to the other when the disc portion (10) moves along the bore (130). The disc portion (10) may be further punctuated to create more fluid passages. A hollow shaft (15), forming a unitary piece with the said disc portion (10), is disposed on the surface of the said disc which faces the closed end of the cylinder (100) and extends perpendicularly from the said surface. It is used to receive the piston rod (110).

In order to vary the drag force experienced by the valve mechanism (90), the annular cover piece (20) is used to adjust the area of which the fluid can flow through the disc portion (10). It slips onto hollow shaft (15) and is disposed adjacent to the disc portion (10). At one position, the cover piece (20) will cover the maximum area of which the fluid can flow through, and as a result, the valve mechanism (90) will experience maximum drag force. However, as the cover piece (20) begins to rotate in a direction, it slowly uncovers the openings. In the same direction, it slowly rotates to another position at which maximum flow of fluid can be achieved. At this position, most openings will be open. In contrast, if the cover piece (20) was to rotate from the position at which maximum flow of fluid through the disc (10) is achieved, in the opposite direction, it would close up the openings again. In one embodiment, the outer periphery of the cover piece (20) is partially chamfered (27) to match the pattern of fluid passages of the disc portion (10), so as to provide a path through which the fluid in the bore (130) can escape.

The rotation of the cover piece (20) is effected by an annular turning piece (40) which is structurally connected to the said cover piece (20) by means of withholding claws (25) extending from the cover piece (20). The outer circular periphery of the turning piece (40) is also partially chamfered (47) and it is placed between the cover piece (20) and the closed end of the cylinder (100). p The turning piece (40) is designed to rotate when it slides along the hollow shaft (15). This is accomplished by having a guide member (17) on the external surface of the hollow shaft (15). The guide member (17) is slightly angled with respect to the common axis of rotation of both cover (20) and turning piece (40). On the other hand, the turning piece (40) has some form of retention mechanism for holding itself onto the guide member (17) and tracing the path of the guide member (17) on the surface of the hollow shaft (15). The mechanism either fits or engages slidingly to the said guide member (17) without dislodging, and can be integral of the turning piece (40). For example, if the guide member is a ridge (17), the corresponding retention mechanism can be a notch (45) having complementary receiving surface which is formed by depressing the inner surface of the turning piece (40). Alternatively, the guide member could be a groove (17A) on the surface of the hollow shaft (15). Knob (45A) extending from the inner surface of the turning piece (40A) fits into the said groove (17A) and consequently the turning piece (40A) is able to turn about the hollow shaft (15) as the knob (45A) slides along the groove (17A).

A spring (30) coiling around the hollow shaft (15) of disc portion (10) is placed in between the cover piece (20) and turning piece (40). When the valve mechanism (90) is stationary, the spring (30) will be filly extended, pushing the turning piece (40) right to the furthest end away from the cover piece (20). The turning piece (40) is prevented from being expelled from the hollow shaft (15) as it is held by the claws (25) which extend from the cover piece (20). A gap exists between the disc portion (10) and the cover piece (20). However, when the external portion of the piston rod (110) is initially depressed, this gap closes up as the disc portion (10) is pushed forward by the piston rod (110). Subsequently, the whole valve mechanism (90) is propelled towards the closed end of the cylinder (100). Initially at low speed, the spring (30) between the cover (20) and turning piece (40) is able to counter the drag exerted on the turning piece (40). However, as the valve mechanism (90) accelerates, the drag on the turning piece (40) also increases. The turning piece (40) inadvertently experiences significant resistance in motion and hence slows down. Being slower than the cover piece (20), the turning piece (40) compresses the spring (30) against the cover piece (20). As it moves relatively towards cover piece (20), the cover piece (20), together with the turning piece (40), rotates and restricts the openings through which the fluid can escape. With less fluid flowing through the disc portion (10), the valve mechanism (90) experiences stronger resistive force to counter the motion of the piston rod (110) until the piston rod (110) slows down to a certain speed. However, when the entire mechanism (90) moves away from the closed end, the turning piece (40) remains at its original position without turning. The disc portion (10) is fully open (with openings minimally covered) and the piston rod (110) extends with minimum resistance.

The invention claimed is:

1. A fluidic damper comprising:
    a closed cylinder filled with fluid, containing a valve mechanism attached to a piston rod, a portion of said piston rod emerges through an opening in an end wall of the cylinder, wherein
    a disc portion having multiple passages for fluid to flow from one side of said disc to the other side, and a shaft with at least one guide members disposed on the surface of said shaft at an angle;
    a rotatable annular cover piece which rotates about the said shaft, such that rotation of the cover piece in one direction closes said passages and in the other direction opens up said passages;
    an annular turning piece, which is structurally connected to the cover piece, having a retention mechanism for holding itself onto said guide member wherein the retention mechanism fits or engages slidingly to said guide member on the surface of the said shaft, so that the turning piece rotates when the retention mechanism slides along the guide member;
    a resilient means disposed between the said turning piece and said cover piece, to push the turning piece back to its original position and consequently rotates the cover piece to a position that opens up the passages of said disc.

2. A fluidic damper according to claim 1 wherein the guide member is a ridge and the retention mechanism is a notch on the inner surface of the turning piece.

3. A fluidic damper according to claim 2 wherein the resilient means is a spring wound around the said shaft.

4. A fluidic damper according to claim 2 wherein the turning piece is structurally connected to the cover piece by means of claws extending from the cover piece to the said turning piece.

5. A fluidic damper according to claim 3 wherein the turning piece is structurally connected to the cover piece by means of claws extending from the cover piece to the said turning piece.

6. A fluidic damper according to claim 1 wherein the guide member is a groove and the retention mechanism is a knob extending from the inner surface of the turning piece.

7. A fluidic damper according to claim 6 wherein the turning piece is structurally connected to the cover piece by means of claws extending from the cover piece to the said turning piece.

8. A fluidic damper according to claim 6 wherein the turning piece is structurally connected to the cover piece by means of claws extending from the cover piece to the said turning piece.

9. A fluidic damper according to claim 1, wherein the shaft is a hollow tube to receive the piston rod therethrough.

10. A fluidic damper as claimed in claim 9, wherein said piston rod is retained across said valve mechanism with a pair of retaining means mounted onto said piston rod against said turning piece and said disc portion respectively.

11. A fluidic damper according to claim 10, wherein the fluidic damper further comprises a spring which connects the closed end of the cylinder at one end and rested on said retaining means at the other end.

12. A fluidic damper according to claim 1 wherein the resilient means is a spring wound around the said shaft.

13. A fluidic damper according to claim 12 wherein the turning piece is structurally connected to the cover piece by means of claws extending from the cover piece to the said turning piece.

14. A fluidic damper as claimed in claim 1, wherein said shaft is partially hollowed to receive said piston rod.

15. A fluidic damper as claimed in claim 14, wherein said shaft having a locking portion which is extended therefrom and said locking portion is mounted with a retaining means having extensions and flanges for retaining said unitary piece of disc portion at one side and said spring of the cylinder at the other side.

16. A fluidic damper according to claim 1 wherein the turning piece is structurally connected to the cover piece by means of claws extending from the cover piece to the said turning piece.

17. A fluidic damper according to claim 1, wherein said multiple passages of the disc are formed with parts of the circular periphery of said disc are removed forming the openings to allow the fluid to pass there through.

18. A fluidic damper according to claim 1, wherein said multiple passages of the disc are formed with openings punctuated adjacent the circular periphery of said disc.

* * * * *